United States Patent [19]

Hood

[11] Patent Number: 4,997,466
[45] Date of Patent: Mar. 5, 1991

[54] AIR FILTER ATTACHMENT FOR COMPRESSOR
[75] Inventor: James A. Hood, Concord, N.C.
[73] Assignee: Ingersoll-Rand Company, Woodcliff Lake, N.J.
[21] Appl. No.: 457,133
[22] Filed: Dec. 26, 1989
[51] Int. Cl.⁵ ............................................. B01D 46/10
[52] U.S. Cl. ...................................... 55/507; 55/508; 55/509; 55/519
[58] Field of Search ................................ 55/505–510, 55/517, 519, 497, 521, 504

[56] References Cited

U.S. PATENT DOCUMENTS

| | | |
|---|---|---|
| 1,639,132 | 4/1925 | Greene . |
| 1,639,133 | 1/1926 | Greene . |
| 1,892,210 | 12/1932 | Gordon . |
| 2,580,013 | 12/1951 | Gazda ............................... 55/507 X |
| 2,824,622 | 2/1958 | Buckman . |
| 3,147,101 | 9/1961 | Phillips . |
| 3,172,749 | 3/1965 | Harroun . |
| 3,174,775 | 3/1965 | Clayton ............................. 55/507 X |
| 3,176,367 | 4/1965 | Risse ................................. 55/507 X |
| 3,290,869 | 12/1966 | Lentz . |
| 3,298,149 | 1/1967 | Sobeck . |
| 3,488,928 | 1/1970 | Tarala ............................... 55/505 X |
| 4,314,832 | 2/1982 | Fox ................................... 55/508 X |
| 4,726,825 | 2/1988 | Natale ............................... 55/519 X |
| 4,758,256 | 7/1988 | Machado . |

Primary Examiner—Charles Hart
Attorney, Agent, or Firm—Glenn B. Foster

[57] ABSTRACT

As an air filter assembly attaches an air filter to an air compressor. The assembly includes an air filter, an outer plate and a baseplate. The air filter is positioned between the outer plate and the baseplate. A mounting device for attachment to the air compressor extends through the air filter and includes an attaching portion at a first end and a tensioning portion at a second end.

13 Claims, 4 Drawing Sheets

AIR FILTER ATTACHMENT FOR COMPRESSOR

BACKGROUND OF THE INVENTION

This invention relates generally to attachment devices and more specifically to a device to attach an air filter to a compressor.

One device presently in use to attach an air filter to a compressor involves fixedly attaching a bracket to a baseplate. Therefore, the baseplate will experience greater stress and will have to be designed accordingly. The use of welding, or other methods to attach the bracket to the baseplate, also increases the cost of the air filter attachment.

In the prior devices, the baseplate had to be firmly attached to the inlet valve by welding, bolting or some other type of connection. Not only was the connection implementation expensive, but the amount of time required to remove the baseplate was often exorbitant.

The foregoing illustrates limitations known to exist in present devices and methods Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by an apparatus including an air filter. Attachment means includes a first leg and a second leg connected to each other at one end, and attached to the air filter to support the air filter. The distance between the legs varies along the length of the legs. A plurality of attachment portions are included, one attachment portion affixed to each of the legs. Baseplate means space the attachment portions a set distance apart. Means extends the first and second legs in an axial direction relative to the baseplate means, resulting in a change of the set distance.

The foregoing and other aspects will become apparent from the following detailed description of the invention when considered in conjunction with the accompanying drawings. It is to be expressly understood, however, that the drawing figures are not intended as a definition of the invention, but are for the purpose of illustration only.

BRIEF DESCRIPTION OF THE DRAWING

FIG. 1 is a top view of one embodiment of an inlet valve which the air filter attachment of the instant invention will be connected to;

DETAILED DESCRIPTION

Figure 1:
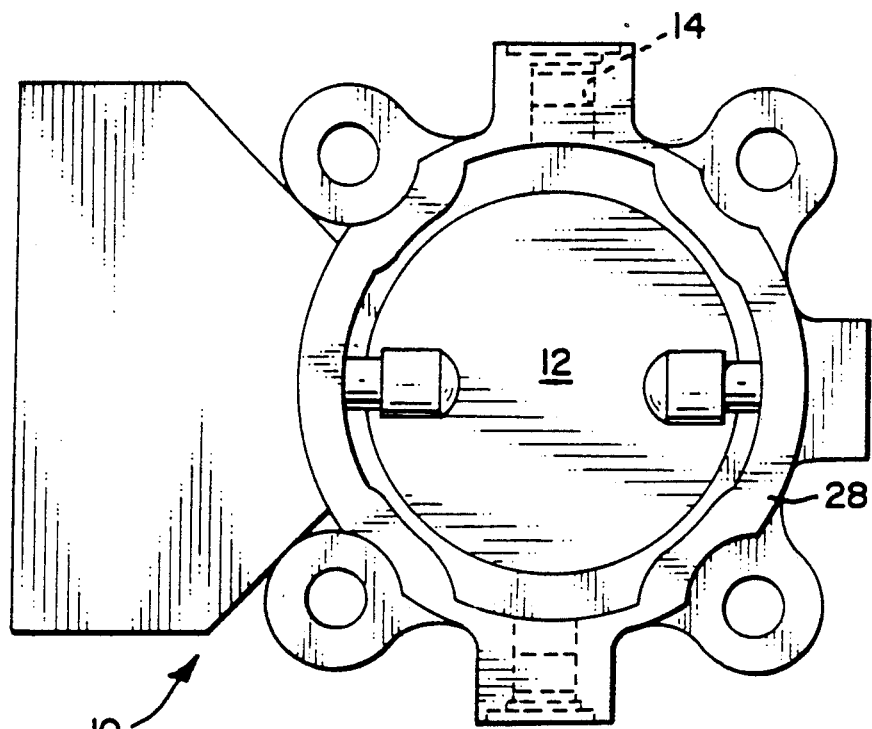
Figure 2:
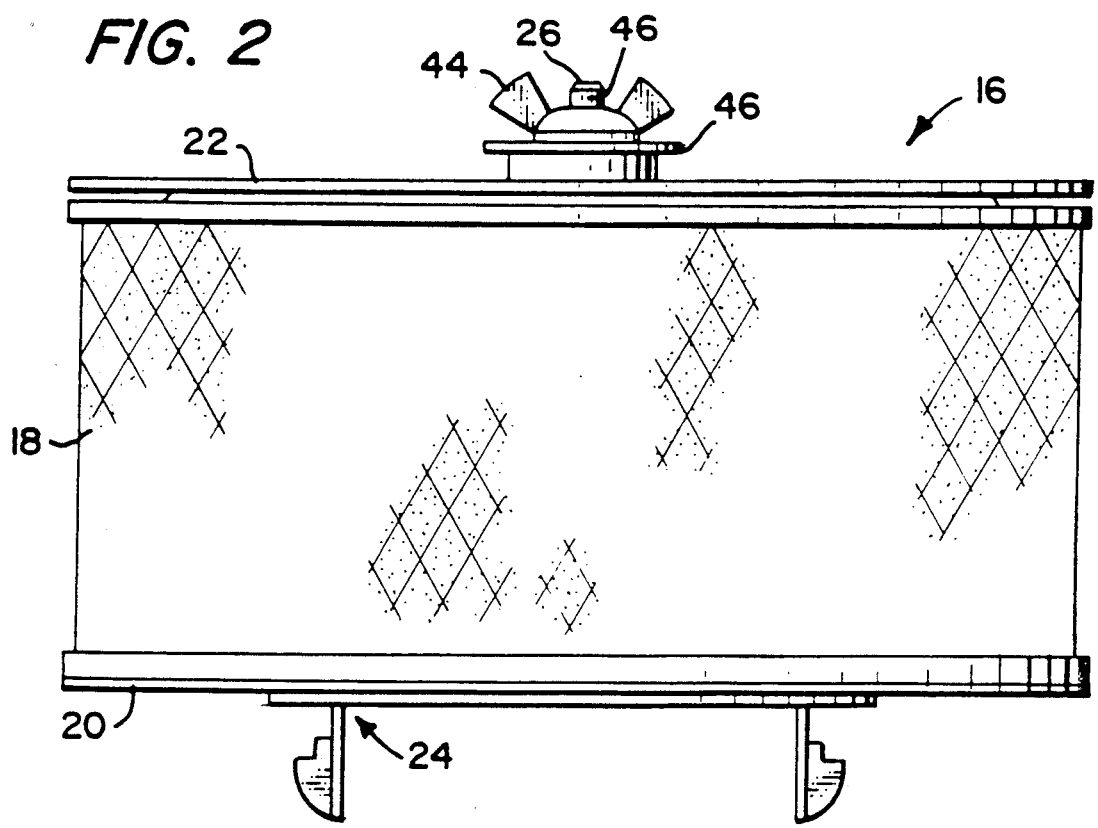
FIG. 2 is a side view of one embodiment of the air filter assembly of the instant invention.
Figure 3:
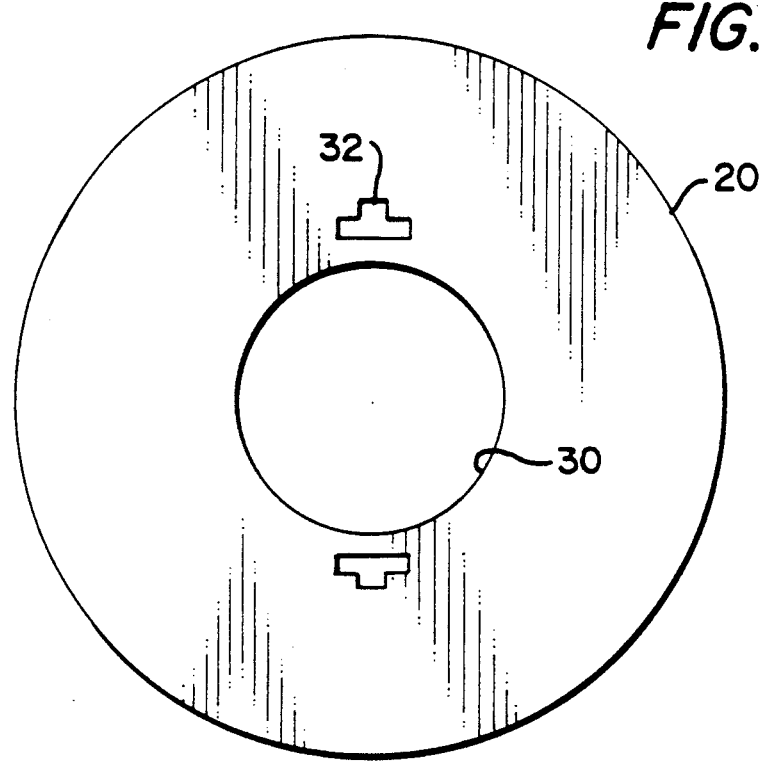
FIG. 3 is a top view of one embodiment of a base plate utilized in the instant invention.
Figure 4:
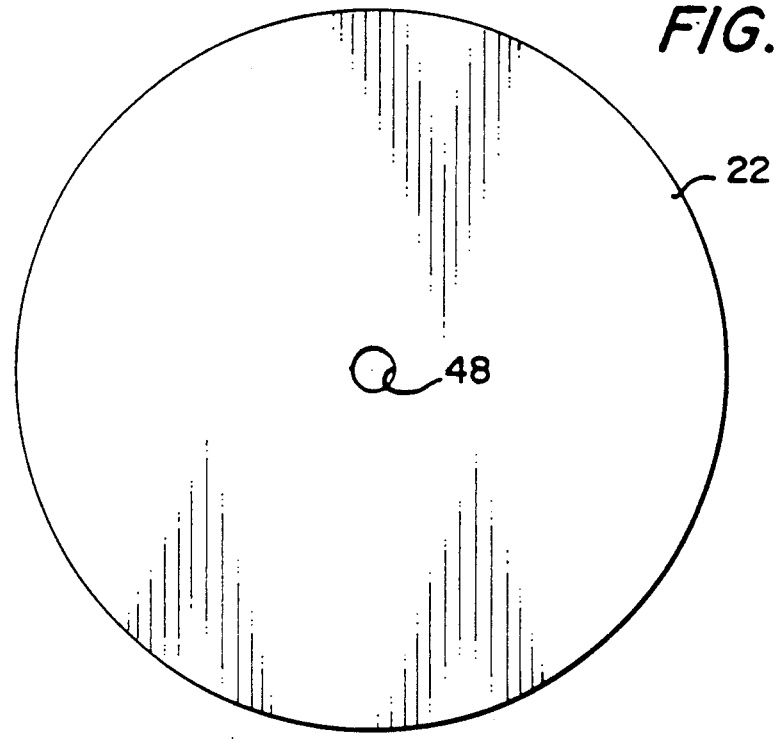
FIG. 4 is a top view of one embodiment of an outer plate utilized in the instant invention.
Figure 5:
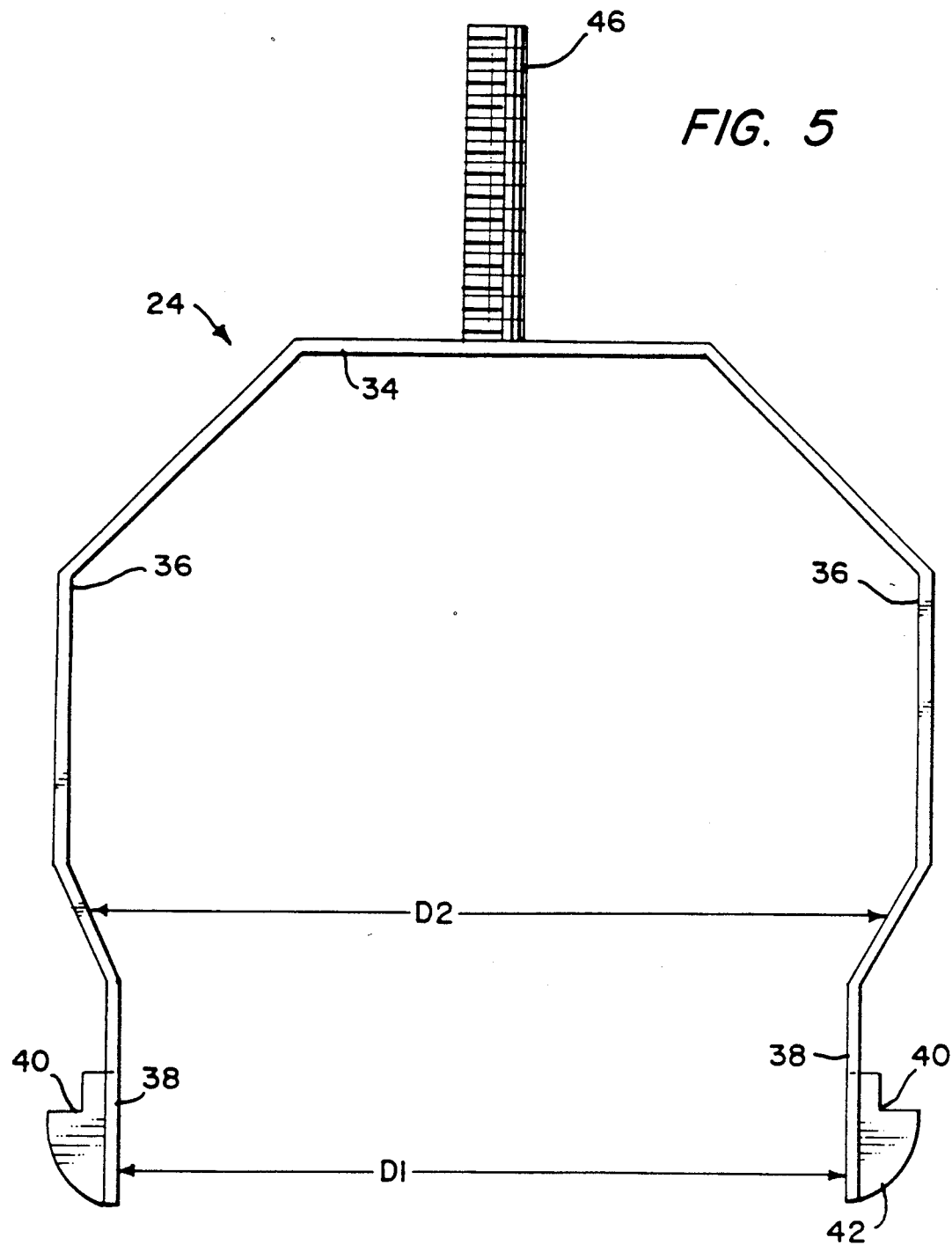
FIG. 5 is a front view of one embodiment of a mounting bracket of the instant invention.
Figure 6:
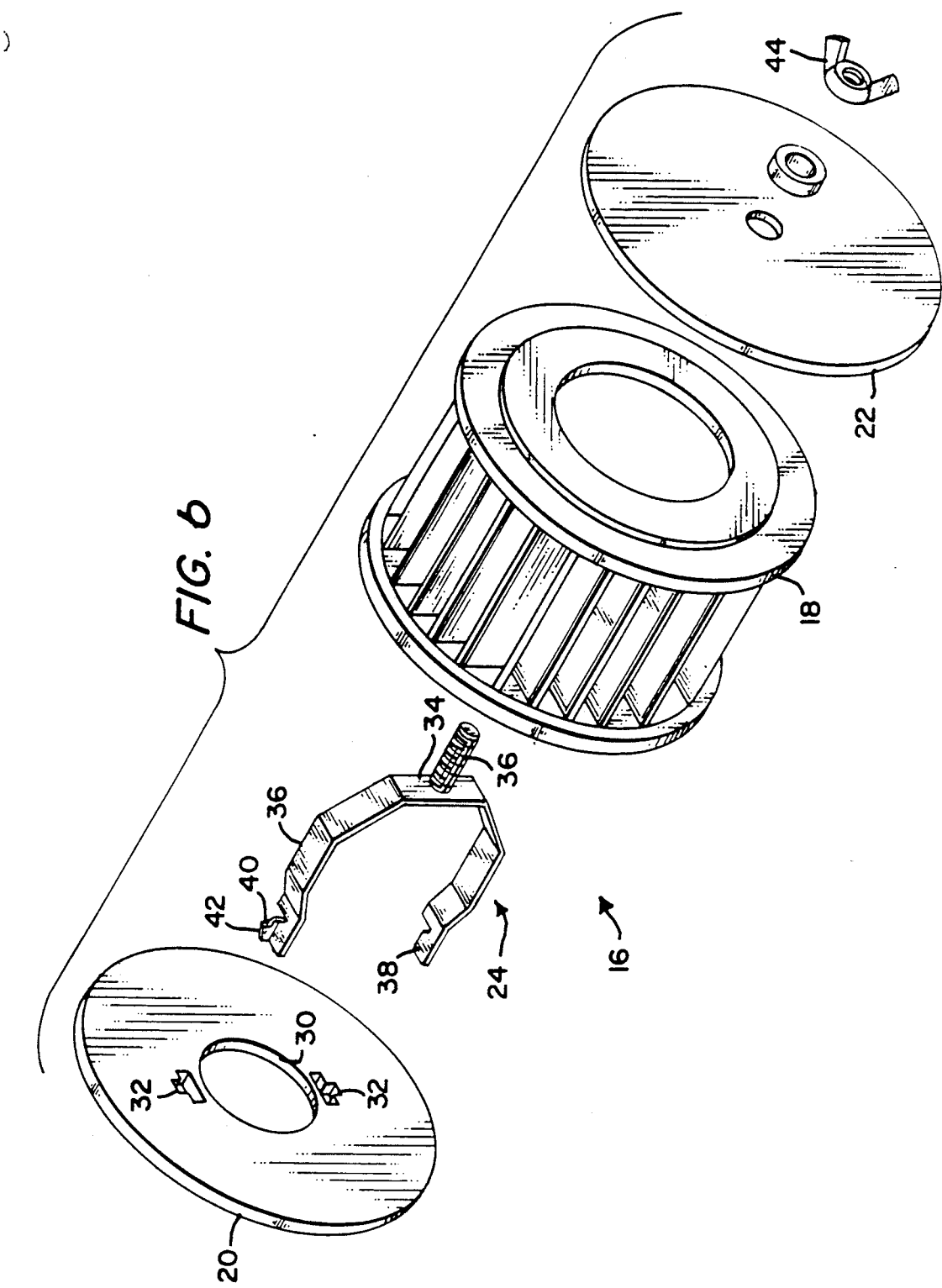
FIG. 6 is an assembly view of the air filter assembly of FIG. 1.

An air compressor 10 has an inlet valve 12 with a recess 14. The recess 14 may be where a blowdown pipe is connected to the compressor 10. An air filter assembly 16 is connected to the compressor 10. The air filter assembly includes an air filter 18, a baseplate 20, an outer plate 22, a mounting bracket 24, and a tensioning member 26.

The air filter 18 is positioned between the baseplate 2 and the outer plate 22. The baseplate 20 is shaped to conform with a mating surface 28 of the compressor 10, such that all air which enters the inlet valve 12 must have passed through the air filter 18 and an aperture 30 formed in the baseplate 20.

The baseplate 20 conforms to the shape of the air filter 18 with the aperture 30 formed in the center of the baseplate. When the air filter assembly is assembled, the mounting bracket will extend through mounting bracket openings 32 which are formed in the baseplate.

Due to this configuration, the force transmitted between the recess 14 and the outer plate 22 through the mounting bracket openings 32 will not be transmitted through the baseplate 20.

The mounting bracket 24 is formed of a generally U-shaped configuration including a connector portion 34 and two leg portions 36. On the outside of each leg portion is a recess attaching portion 38 having a recess edge portion 40 provided to securely restrain the leg portion 36 with respect to the recess 14 whenever the recess edge portion 40 is in contact with the recess 14.

The recess attaching portion 38 also includes recess attachment sloped portion 42 which permits sliding of the recess attaching portion 38 with respect to the inlet valve when the air filter assembly 16 is being installed.

The tensioning member 26, which is affixed to the connector portion, may include a tensioning nut 44, tensioning bolt 46 and washer 46. A tensioning aperture 48, which can accommodate the tensioning bolt 44, is formed in the outer plate 22. Tightening of the tensioning nut 44, when the air filter assembly 16 is in an assembled position and the recess attachment portion 38 is in engagement with the recess 14, will cause the air filter assembly 16 to be tightened against the recess 14.

The recess attaching portion 38, when in engagement with the recess 14, acts as a baffle to diffuse the flow of fluid entering recess 14 (which may be the blowdown pipe). This baffling effect not only silences the noise of the fluid entering the valve, but also acts to coalesce small amounts of oil that may be present in the blowdown air to minimize fouling of the inlet air filter.

The distance D1 between the leg portions 36 adjacent to the end of the leg portions is less than the distance D2 between the leg portions not adjacent the end of the leg portion. Since the leg portions fit within the mounting bracket openings 32, which are a fixed distance apart, when the baseplate is at the D1 position, the end of the leg portions 36 are going to be a greater distance apart than when the baseplate is at the D1 position.

In this manner, the distance between the recess attaching portions 38 may be decreased for inserting the air filter assembly 16 into the inlet valve 12, and increased for securing the air filter assembly to the recesses 14.

While this invention has been illustrated and described in accordance with a preferred embodiment, it is recognized that variations and changes may be made therein without departing from the invention as set forth in the claims.

What is claimed is:

1. An apparatus comprising:
   an air filter;

attachment means including a first leg and a second leg connected to each other at one end, and attached to the air filter to support the air filter, wherein the distance between the legs varies along the length of the legs;

a plurality of attachment portions, one attachment portion affixed to each leg;

baseplate means for spacing the attachment portions a set distance apart; and means for moving the first and second legs in an axial direction relative to the baseplate means, resulting in a change of the set distance.

2. The apparatus as described in claim 1, wherein the attachment means is U shaped, having a connector portion and the two legs.

3. The apparatus as described in claim 2, wherein the moving means controls the distance between the connector portion and the baseplate means.

4. An apparatus comprising:

an air filter affixed to an air inlet;

attachment means including a plurality of spaced legs connected to one another at one end, and connected to the air filter to support the air filter, the legs including at least one section wherein the distance between the legs varies along the length of the legs;

baseplate means extending between the legs for maintaining the portion of the legs adjacent the baseplate means a constant distance apart;

engaging means on portions of the legs distant from said one end adapted to engage a recess formed in the air inlet; and means for moving the legs relative to the baseplate means, wherein the distance between the engaging means will change as the legs are moved lengthwise in relation to the spacer means.

5. The apparatus as described in claim 4, wherein the attachment means is U shaped, having a connector portion connecting the two legs.

6. The apparatus as described in claim 5, wherein the moving means controls the distance between the connector portion and the baseplate means.

7. The apparatus as described in claim 5, wherein a substantially perpendicular distance between the legs, when the attachment means is in a relaxed state, changes along at least one section of the legs.

8. An apparatus comprising:

an air filter means for filtering a fluid flow entering an air inlet;

attachment means including a first leg and a second leg connected to each other at one end and attached to the air filter at said one end to support the air filter, wherein the distance between the legs varies along the length of the legs;

a plurality of attachment portions, one attachment portion affixed to each leg, the attachment portions adaptable for attachment to a recess formed in the air inlet;

baseplate means for spacing the attachment portions a set distance apart; and means for moving the first and second legs in an axial direction relative to the baseplate means, resulting in a change of said set distance.

9. The apparatus as described in claim 8, wherein the attachment portions engage with the recess when the set distance is at a maximum, preventing movement of the air filter relative to the air inlet.

10. The apparatus as described in claim 9, wherein the attachment portions become disengaged with the recess when the set distance is at a minimum, permitting relative motion between the air filter and the air inlet.

11. An apparatus comprising:

an air filter means for filtering a fluid flow entering an air inlet of an air compressor;

attachment means including a first leg and a second leg connected to each other at one end and attached to the air filter at said one end to support the air filter on the air inlet, wherein the distance between the legs varies along the length of the legs;

a plurality of attachment portions, one attachment portion affixed to each leg, the attachment portions adaptable for attachment to a recess formed in the air inlet of the air compressor;

baseplate means for spacing the attachment portions a set distance apart; and means for moving the first and second legs in an axial direction relative to the baseplate means, resulting in a change of said set distance.

12. The apparatus as described in claim 11, wherein the attachment portions engage with the recess when the set distance is at a maximum, preventing movement of the air filter relative to the air inlet.

13. The apparatus as described in claim 12, wherein the attachment portions become disengaged with the recess when the set distance is at a minimum, permitting relative motion between the air filter and the air inlet.

* * * * *